United States Patent
Kelly et al.

(10) Patent No.: US 7,683,950 B2
(45) Date of Patent: Mar. 23, 2010

(54) METHOD AND APPARATUS FOR CORRECTING A CHANNEL DEPENDENT COLOR ABERRATION IN A DIGITAL IMAGE

(75) Inventors: Sean C. Kelly, Rochester, NY (US); Peter D. Burns, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 1336 days.

(21) Appl. No.: 11/114,841

(22) Filed: Apr. 26, 2005

(65) Prior Publication Data
US 2006/0239549 A1     Oct. 26, 2006

(51) Int. Cl.
H04N 5/208     (2006.01)
G06K 9/40      (2006.01)

(52) U.S. Cl. ................................ 348/252; 382/255

(58) Field of Classification Search ............ 348/241, 348/252; 360/255, 260–264, 266, 269, 275
See application file for complete search history.

(56) References Cited

U.S. PATENT DOCUMENTS

| | | |
|---|---|---|
| 4,418,358 A | 11/1983 | Poetsch et al. |
| 4,536,885 A | 8/1985 | Loughlin |
| 4,616,252 A | 10/1986 | Schiff |
| 4,677,465 A | 6/1987 | Alkofer |
| 4,937,720 A | 6/1990 | Kirchberg |
| 4,961,139 A | 10/1990 | Hong et al. |
| 4,970,593 A | 11/1990 | Cantrell |
| 5,010,401 A | 4/1991 | Murakami et al. |
| 5,047,968 A | 9/1991 | Carrington et al. |
| 5,291,286 A | 3/1994 | Murakami et al. |
| 5,293,258 A | 3/1994 | Dattilo |
| 5,461,440 A | 10/1995 | Toyoda et al. |
| 5,561,611 A | 10/1996 | Avinash |
| 5,565,931 A | 10/1996 | Girod |
| 5,696,850 A | 12/1997 | Parulski et al. |
| 5,721,694 A | 2/1998 | Graupe |
| 5,729,631 A | 3/1998 | Wober et al. |

(Continued)

FOREIGN PATENT DOCUMENTS

WO     WO 98/31142     12/1997

(Continued)

OTHER PUBLICATIONS

XP000443551, M. Doyle et al., "Adaptive Fourier Threshold Filtering: A Method to Reduce Noise and Incoherent Artifacts in High Resolution Cardiac Images", 8306 Magnetic Resonance in Medicine 31 May 1999, No. 5, Baltimore, Maryland, US, pp. 546-550.

(Continued)

*Primary Examiner*—Timothy J Henn
(74) *Attorney, Agent, or Firm*—Robert L. Walker

(57) ABSTRACT

A method, and digital capture apparatus for use therewith, is described for correcting a channel dependent color aberration in a digital image, where the digital image is composed of a plurality of color channels. The method includes capturing an image comprising the color channels, where one of the color channels is a blurred color channel due to a channel dependent color aberration affecting that channel. Then, one of the other color channels, other than the blurred color channel, is used as an indication of an aim sharpness, and the sharpness of the blurred color channel is adjusted, at least partially, toward the aim sharpness.

27 Claims, 14 Drawing Sheets

U.S. PATENT DOCUMENTS

| | | | |
|---|---|---|---|
| 5,801,854 | A | 9/1998 | Naylor, Jr. |
| 5,900,952 | A | 5/1999 | Fan |
| 5,939,246 | A | 8/1999 | Brewer et al. |
| 6,009,209 | A | 12/1999 | Acker et al. |
| 6,055,340 | A * | 4/2000 | Nagao ............... 382/261 |
| 6,628,329 | B1 | 9/2003 | Kelly et al. |
| 6,728,003 | B1 | 4/2004 | Gallagher et al. |
| 2002/0097439 | A1 | 7/2002 | Braica |
| 2004/0047514 | A1 | 3/2004 | Gallagher et al. |
| 2004/0081364 | A1* | 4/2004 | Murphy ............... 382/260 |
| 2004/0218071 | A1 | 11/2004 | Chauville et al. |
| 2004/0218803 | A1 | 11/2004 | Chanas et al. |
| 2004/0240750 | A1 | 12/2004 | Chauville et al. |
| 2004/0247195 | A1 | 12/2004 | Chauville et al. |
| 2004/0247201 | A1 | 12/2004 | Arazaki |
| 2006/0093234 | A1* | 5/2006 | Silverstein ............ 382/255 |
| 2006/0181620 | A1* | 8/2006 | Kimbell ............... 348/241 |

OTHER PUBLICATIONS

XP002146062, B Aiazzi et al., "A Robust Method For Parameter Estimation of Signal-Dependent Noise Models in Digital Images", 0-7803-4137-Jun. 1997, IEEE, pp. 601-604.

XP000225283, Aggelos K. Katsaggelos et al., "A Regularized Iterative Image Restoration Algorithm", IEEE Transactions on Signal Processing, vol. 39, No. 4, Apr. 1991, pp. 914-929.

XP000780652, Til Aach et al., "Anisotropic Spectral Magnitude Estimation Filters For Noise Reduction and Image Enhancement", 0-7803-3258-X96, 1996, IEEE, Philips GmbH Research Laboratories, Weisshausstr.2, D-52066 Aachen, Germany, pp. 335-338.

XP002146454, Rangaraj M. Rangayyan et al., "Adaptive-neighborhood Filtering of Images Corrupted By Signal-Dependent Noise", 0003-6935/98/204477-11, Jul. 10, 1998, vol. 37, No. 20, Applied Optics, 1998 Optical Society of America, Department of Electrical and Computer Engineering, University of Calgary, 2500 University Drive, N.W. Calgary, Alberta T2N 1N4, Canada, pp. 4477-4487.

XP000896196, Mei Yu et al., "New Adaptive Vector Filter Based on Noise Estimate", IEICE Transactions Fundamentals vol. E-82A No. 6, Jun. 1999, Paper, Sepcial Section of Papers Selected from ITC-CSCC 98, pp. 911-919.

XP000280610, J.N. Lin et al., "2-D Adaptive Volterra Filter For 2-D Nonlinear Channel Equalization and Image Restoration", 8030 Electronic Letters, vol. 28, No. 2, Jan. 16, 1992, Stevenage, Herts, pp. 180-182.

* cited by examiner

CONVOLUTION KERNEL 0.0002046,-0.028518,-0.064878,-0.071265,-0.064878,-0.028518,0.002046,
-0.028518,-0.081978,-0.043607,-0.016675,-0.043607,-0.081978,-0.028518,
-0.064878,-0.043607,0.112658,0.221827,0.112658,-0.043607,-0.064878,
-0.071265,-0.016675,0.221827,1.4295565,0.221827,-0.016675,-0.071265,
-0.064878,-0.043607,0.112658,0.221827,0.112658,-0.043607,-0.064878,
-0.028518,-0.081978,-0.043607,-0.016675,-0.043607,-0.081978,-0.028518,
0.002046,-0.028518,-0.064878,-0.071265,-0.064878,-0.028518,0.002046

*FIG. 5*

METHOD AND APPARATUS FOR CORRECTING A CHANNEL DEPENDENT COLOR ABERRATION IN A DIGITAL IMAGE

FIELD OF THE INVENTION

The present invention relates generally to the field of photography, and in particular to imaging systems producing electronically derived images that have channel dependent color aberrations, such as longitudinal color artifacts or aberrations in captured images.

BACKGROUND OF THE INVENTION

Imaging apparatus, such as photographic film cameras and electronic cameras, and in particular their optical assemblies, have inherent aberrations which can degrade the quality of images captured by such apparatus. One kind of aberration is a distortion, which refers to a change in the geometric representation of an object in the image plane. For instance, a rectangle might be reproduced with a pincushion or a barrel shape—hence the reference to pincushion distortion or barrel distortion. Another type of aberration, referred to as chromatic aberration, results from the fact that different wavelengths or colors of light are refracted by different amounts by an optical assembly. A further type of aberration is a field dependent aberration, where some characteristic, such as the brightness, of an image pixel is changed in the image plane in proportion to its position in the field, such as its distance from the center of the image.

Chromatic aberration appears when a lens is transmitting polychromatic light (many colors). Since the index of refraction of optical glass is wavelength dependent, the red, green and blue components bend differently at an optical interface in the lens. This leads to longitudinal (axial) and/or lateral chromatic aberration effects. When a lens fails to focus various colors sharply in the same plane, the lens is said to exhibit longitudinal (axial) chromatic aberration. In longitudinal chromatic aberration, the three components are brought to focus on different planes in the image space, which gives a color blurring effect. Thus, longitudinal chromatic aberration arises due to the focal length varying with wavelength (color). In lateral chromatic aberration, color components from a single point are brought to focus to different points on the same image plane, resulting in a lateral shift of the image. This has the effect of magnifying the three colors differently and can be visually seen as color fringing. Thus lateral chromatic aberration can be seen as an effect due to magnification varying with wavelength.

A great deal of the complexity of modern lenses is due to efforts on the part of optical designers to reduce optical aberrations. In certain cases, such as with single use film cameras or inexpensive digital cameras, it may be economically difficult to avoid usage of inexpensive optics. Unfortunately, as explained above, such optics possess inherent aberrations that degrade the quality of images formed by the optics. Consequently, it is desirable to compensate for these aberrations in the reproduction process (either in the capture device or in a host computer) so that final images free of aberrations may be obtained. In order to characterize these aberrations, the ability of a lens to transfer information from the object to an image plane is represented as a modulation transfer function (MTF). A lens MTF is a measure of how well the original frequency-dependent contrast of the object is transferred to the image.

In a typical camera, in addition to distortion and chromatic aberrations, the image formed at a focal plane (where the film or image sensor is located) can be blurred as a function of proximity to the optical axis of the optical assembly. For such field dependent aberrations, the further away from the optical axis (normally, the center of the image), the more the image is blurred. The resultant image therefore has an MTF that is a function of radial distance from the center of the image. The problem is exaggerated with images originating from inexpensive cameras, such as single use film cameras. Because of their simple optics or because the film may not be located in the position of best focus throughout the focal plane, single use film cameras tend to have significant sharpness loss with movement away from the optical axis toward the edges of the frame. Consequently, it is also desirable to compensate for these aberrations in the reproduction process (either in the capture device or in a host computer) so that final images free of field dependent aberrations may be obtained.

In one example, a camera system described in U.S. Pat. No. 5,461,440, entitled "Photographing Image Correction System" and issued Oct. 24, 1995 in the names of Toyoda et al., does not require an expensive optical assembly that is corrected for marginal attenuation (light amount irregularity) and distortion (pincushion and barrel distortion). Instead, the curvature of field data and the light amount irregularity data corresponding to the optical assembly are identified in advance, and stored either in the camera or separately at a downstream scanning and processing station. Either way, the data is linked to the specific camera and then used in subsequent film processing and scanning to correct the image signal for the image quality degradation imparted by the optical assembly.

The image quality of captured images can be improved by the selection of appropriate filters for the input imaging device and subsequent devices that process the captured images. For instance, in U.S. Pat. No. 4,970,593, entitled "Video Image Enhancement Utilizing a Two-dimensional Digital Aperture Correction Filter" and issued Nov. 13, 1990 in the name of C. Cantrell, the modulation transfer function (MTF) of the uncorrected optical system is measured and an aperture correction function is created from an inverse of the MTF function to correct an image captured through the optical system. In commonly-assigned U.S. Pat. No. 5,696,850, entitled "Automatic Image Sharpening in an Electronic Imaging System" and issued Dec. 9, 1997 in the names of Kenneth Parulski and Michael Axman, a digital image produced by a digital camera is improved by using a sharpening filter that is produced as a function of the system MTF. Although these arrangements produce an improved image, there are still problems with image quality. For example, the image can still suffer from position dependent blur and channel dependent blur.

Commonly assigned U.S. Pat. No. 6,628,329, entitled "Correction of Position Dependent Blur in a Digital Image" and issued Sep. 30, 2003 in the names of Sean C. Kelly, Donald Williams and David Jasinski, describes the correction of position dependent blur in a digital camera, where the position dependence is a function of the proximity of a pixel to the optical axis. Typically, the camera manufacturer measures the MTF at various locations in the image, and then creates a boost map that is applied to a sharpening kernal to adjust for position blur of the captured image. The boost value at each of the pixels of the image is inversely proportional to the actual MTF, i.e., equal to a desired MTF value divided by the actual MTF value for that pixel. It is desirable that this technique be used to spatially equalize the sharpness, to correct for lens sharpness roll off. This technique is also useful in purposefully modifying the local MTF to some different aim (either inducing local blur or enhanced sharpness).

Some aberrations, specifically chromatic aberrations, are channel dependent aberrations in the sense that each color channel, e.g., red, green and blue channels, provides a different amount of the aberration artifact in the image plane. It has also been observed that some field dependent aberrations, such as position dependent blur, are also channel dependent. Consequently, a different amount of correction would ideally be provided for each color channel at the image plane. For instance, lens designers typically provide complicated, and therefore expensive, designs to differentially control the light rays according to wavelength in order to minimize such artifacts.

Especially if they are intended for consumer use, digital cameras, which are inherently more complex and expensive than simple film cameras, such as single use film cameras, must control cost in any way possible. The camera optics is a typical candidate for cost reduction, and channel-dependent artifacts thus becomes a concern. Despite such image quality concerns, it is usually desirable to provide a finished image file that is corrected for camera-related influences. What is needed is a simple correction for channel dependent aberrations, such as channel dependent blur and sharpness fall-off, that does not require a more complex, or more expensive, optical system, as well as a correction that can be implemented in the processor of a digital camera, or in the downstream scanning and processing of a film system. More specifically, a simple correction is needed for the kind of channel dependent blurring caused by longitudinal chromatic aberration and field dependent effects.

Channel dependent corrections for a printing process are addressed in commonly assigned U.S. Pat. No. 6,728,003, entitled "Method of Compensating for MTF in a Digital Image Channel," and issued Apr. 27, 2004 in the names of Andrew Gallagher and Robert Parada. In this patent, a digital image comprises a plurality of digital image channels, such as red, green and blue channels. A degradation in the MTF of a device in an imaging chain is compensated by using the MTF and a gain factor to provide an aim response, generating a filter from the aim response, and then using the filter to process the image channel. In published U.S. Patent Application 2004/0218071, entitled "Method and System for Correcting the Chromatic Aberrations of a Color Image Produced by Means of an Optical System" and published Nov. 4, 2004 in the names of Chauville et al., a system and method is described for correcting the chromatic aberrations of a digital image composed of a plurality of color planes. The geometric anomalies, especially distortions, of the digitized color planes are modeled and corrected, at least partly, in such a way as to obtain corrected color planes. The corrected color planes are then combined in such a manner as to obtain a color image corrected completely or partly for the distortion-based chromatic aberrations. Neither Gallagher et al. nor Chauville et al. address longitudinal chromatic aberrations or field dependent artifacts.

What is therefore needed is a method for removing the aberration of longitudinal color in captured digital images. In particular, there is need for a restoration algorithm that can remove the negative imaging artifacts associated with the aberration of longitudinal color. These negative artifacts include color fringing wherein the three color planes do not line up on top of each other, and sub-optimal sharpness in at least one of the color channels.

SUMMARY OF THE INVENTION

The object of the invention is to remove a channel dependent color aberration from a digital image.

A further object of the invention is to remove a longitudinal color aberration from a captured digital image.

A further object of the invention is to remove a channel and field dependent color aberration from a captured digital image.

A further object of the invention is to remove a channel dependent color aberration from a digital image created by a zoom lens system.

The present invention is directed to overcoming one or more of the problems set forth above. Briefly summarized, according to one aspect of the invention, the invention comprises a method for correcting a channel dependent color aberration in a digital image, where the digital image is composed of a plurality of color channels. The method comprises the steps of capturing an image comprising the color channels, where one of the color channels is a blurred color channel due to a channel dependent color aberration affecting that channel; using another color channel, other than the blurred color channel, as an indication of an aim sharpness; and adjusting the sharpness of the blurred color channel, at least partially, toward the aim sharpness.

In a further aspect of the invention, the channel dependent color aberration is a longitudinal color aberration, the blurred color channel is a blue channel, and the other color channel used as an indication of an aim sharpness is a green color channel.

In yet a further aspect of the invention, the step of adjusting the sharpness of the blurred channel toward the aim sharpness comprises determining the MTF of the blurred color channel and the MTF of the other color channel used as an indication of the aim sharpness; determining a ratio of the MTF of the other color channel to the MTF of the blurred color channel; using the ratio to generate a filter, wherein the ratio is the aim frequency response of the filter; and applying the filter to the blurred color channel to adjust the sharpness of the blurred color channel, at least partially, toward the aim sharpness.

In yet a further aspect of the invention, where the optical system is a zoom system with a plurality of zoom lens positions and the MTF of the optical system for the color channels varies for different lens positions, the method further comprises the steps of computing an MTF correction as a ratio of the MTF of the other color channel to the MTF of the blue color channel for at least some of the lens positions; using the computed corrections to generate a filter that varies its filtering effect with lens position; and applying the filter to the blue color channel to equalize the sharpness of the blue color channel, at least partially, to the aim sharpness dependent upon the zoom lens position.

The advantage of this invention is that it allows design and use of a significantly lower cost lens, since a color channel dependent aberration (such as a longitudinal color aberration) can be allowed into the design and later corrected by the image processing method according to the invention. With such a lens design, a camera is able to have an inexpensive lens while maintaining acceptable image quality and at the same time reducing fringing and blurring through subsequent image processing. This improvement in image processing is particularly useful with inexpensive digital cameras, and especially with camera phones, which must be extremely low cost and may have compromised lens designs.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 5 shows an example of a least squares 7×7 convolution kernel that achieves an adequate approximation of the filter frequency response, as characterized by the ratio shown in FIG. 4, that is required to equalize the sharpness of the blue channel to the green.

DETAILED DESCRIPTION OF THE INVENTION

Figure 1:
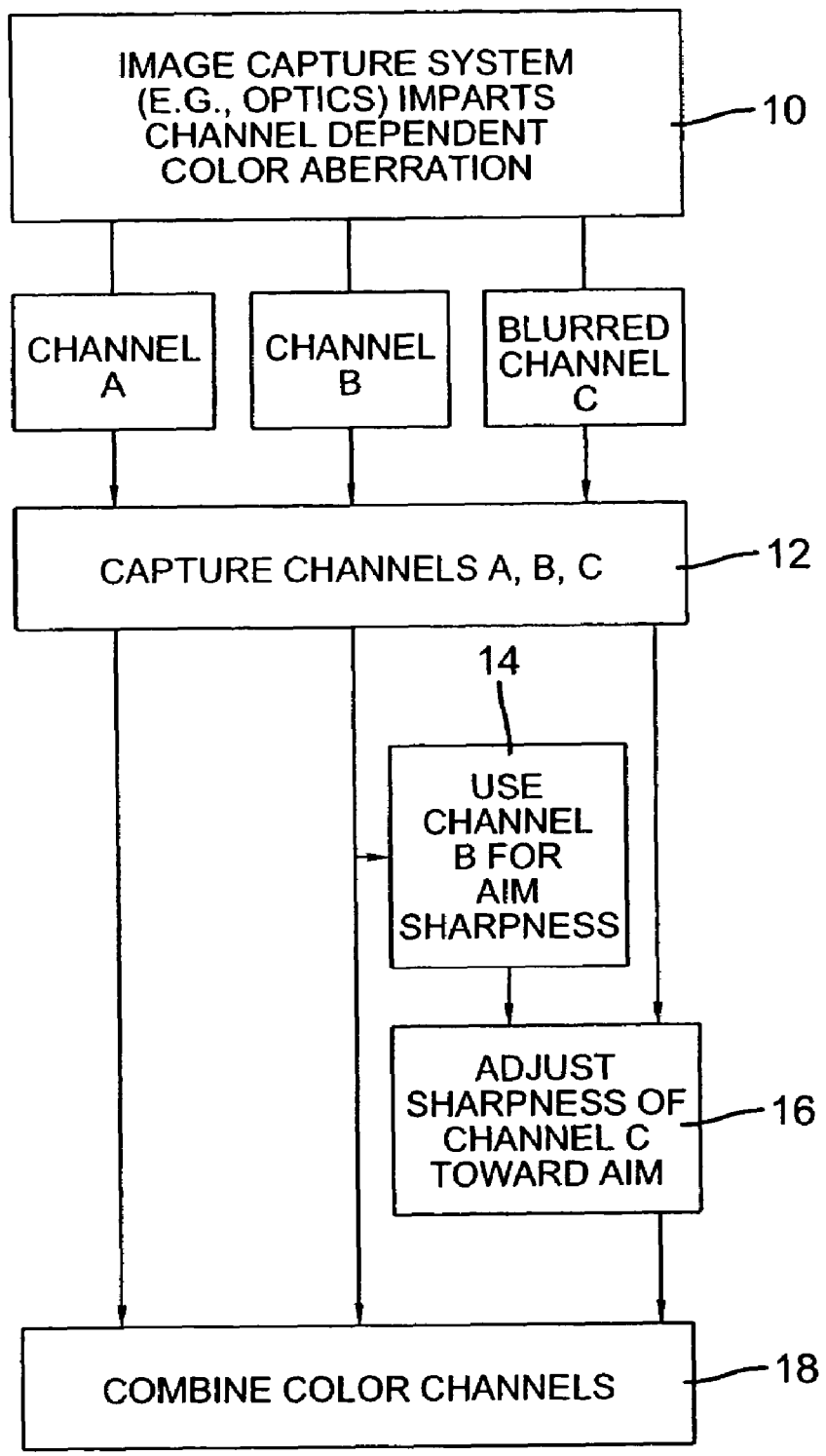
FIG. 1 is a flow diagram showing the method for correcting a channel dependent color aberration according to the invention.

Because digital cameras employing imaging devices and related circuitry for signal capture and correction are well known, the present description will be directed in particular to elements forming part of, or cooperating more directly with, method and apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

One of the most important characteristics of an electronic imaging system is the ability of its imaging device to capture fine detail found in an original scene. This ability to resolve detail is determined by a number of factors, including the performance of the optical system, the number of addressable photo elements in the optical imaging device, and the electrical circuits in the camera, which may include image compression and gamma correction functions. Different measurement methods can provide different metrics to quantify the resolution of an imaging system, or a component of an imaging system, such as a lens. Resolution measurement metrics include resolving power, limiting resolution (at some specified contrast), modulation transfer function (MTF), and optical transfer function (OTF). Mathematically, the modulation transfer function is the modulus of the optical transfer function, which is the two-dimensional Fourier transform of the point spread function of the imaging system under consideration. The OTF is a complex function whose modulus (MTF) has the value unity at zero spatial frequency. Although the focus in this application is on use of the modulation transfer function to characterize the resolution of the capture and output devices, other metrics could be used, for example the OTF, spatial frequency response or depth of modulation level at various spatial frequencies. These are all various forms of spatial transfer functions that can be used to characterize the sharpness of an image from an imaging device.

The advantage of the spatial transfer functions is that they provide information about image quality over a range of frequencies rather than just at the limiting frequency as does resolving power. More particularly, the modulation transfer function is a graph (i.e., a set of discrete modulation factors) that represents the image contrast relative to the object contrast on the vertical axis over a range of spatial frequencies on the horizontal axis, where high frequency corresponds to small detail in an object. If it were possible to produce a facsimile image, the contrast of the image would be the same as the contrast of the object at all frequencies, and the MTF would be a straight horizontal line at a level of 1.0. In practice, the lines always slope downward to the right, since image contrast decreases as the spatial frequency increases. Eventually the lines reach the baseline, representing zero contrast, when the image-forming system is no longer able to detect the luminance variations in the object. The MTF can be determined for each component in an image-forming system or for combinations of components. The MTF can also be determined for each color component being imaged, such as red, green and blue, in a given image plane in an image-forming system. The MTF for a system can be calculated by multiplying the modulation factors of the components at each spatial frequency. Since the MTF curves of all of the devices in a system are multiplied together point by point to provide the system MTF curve, the system curve is also a downwardly sloping function diminishing to zero resolution as the spatial frequency increases.

This downwardly sloping characteristic results in a gradual loss of contrast in the detail of the image as the detail becomes finer and finer. For example, all optical devices have a non-ideal MTF response curve because of the finite size of the optical aperture associated therewith. The MTF curve of such optical devices is normally a monotonically decreasing function such as a downwardly sloping diagonal line, i.e., a set of diminishing modulation factors, that intersects the spatial frequency axis at a point of frequency less than or equal to the diffraction limit—the point at which contrast or resolution diminishes to zero. A filter can be designed with a transfer function to compensate for the diffraction effects of the finite size of the optical aperture of the system. If the filter curve is the inverse of the system MTF curve, the composite curve will be substantially flat out to the diffraction limit. The filter thus boosts the high spatial frequency contrast to compensate for the downwardly sloping characteristic of the system MTF.

As mentioned above, a chromatic aberration results from the fact that different wavelengths or colors of light are refracted by different amounts by an optical assembly. In a longitudinal chromatic aberration, the three components are brought to focus on different planes in the image space, which gives a color blurring effect. In other words, axial chromatic aberration arises due to the focal length varying with wavelength (color). A further type of aberration is a field dependent aberration, where some characteristic, such as the brightness, of an image pixel is changed in the image plane in proportion to its position in the field, such as its distance from the center of the image.

It is instructive to note that the present invention utilizes a digital image, which is typically a two-dimensional array of red, green, and blue pixel values. In addition, a preferred embodiment is described with reference to a digital image of a given number of rows of pixels and a given number of lines of pixels. The value of a pixel of a digital image located at coordinates (x,y), shall herein comprise a triad of values [r(x,y), g(x,y), b(x,y)] respectively referring to the values of the red, green, and blue digital image channels at location (x,y). In this regard, a digital image comprises a certain number of digital image channels. In the case of a digital image consisting of red, green and blue two-dimensional arrays, the image consists of exactly three channels. The term "digital image channel" will be understood to encompass a single plane of a digital image. For example, if a digital image has red, green and blue components there are three channels. The present invention can be applied to one or more digital image channels. For purposes of the present invention each digital image channel may be considered to be a digital image.

The present invention relates to a method for processing a digital image channel to compensate for MTF degradations in an optical system comprising one or more optical components, e.g., one or more lenses. The MTF can be that of a single optical component which provides significant aberration of a digital image channel either during capture or processing, or it can be a group of optical components which provide significant aberration of a digital image channel either during capture or processing. Moreover, the optical system may be a zoom lens system, where a group of optical components provide significant aberration of a digital image channel either during capture or processing dependent upon component lens positions during the zooming sequence. In other words, the MTF of such a zoom lens will vary with zoom lens position, i.e., with zoom focal length.

Note that the present invention may be applied to a single digital image channel (for instance, the red channel, the green channel, or the blue channel), several digital image channels of a digital image, or all the digital image channels of the digital image. Also note that the present invention does not specify the source of the digital image. The digital image may, for example, be captured with a digital camera. The digital image may also be one of a motion picture sequence. The image possessing the aberration may, for example, be captured with a photographic film camera and the digital image is obtained by scanning or otherwise processing the film image. Additionally, the digital image may be any actual scene processed by an optical system.

Turning now to FIG. 1, there is shown a method for correcting a channel dependent color aberration in a digital image, where the digital image comprises a plurality of color channels. In optics block 10, an optical assembly comprising one or more lens components imparts one or more channel dependent aberrations to the original image. More specifically, a specific aberration is associated with one or more of the image channels, that is, as shown in FIG. 1, channels a and b are substantially free of the aberration while channel c possesses the aberration. In this illustration, the aberration is a longitudinal chromatic aberration that produces a blurred channel c.

The three channels a, b and c are captured in an image capture block 12. In the preferred embodiment, the image capture is performed by a digital camera. However, the image capture may be performed by scanning an original, such as a photographic film, where the original was itself captured by an optical assembly possessing the aberration. (Of course, the scanning optics may introduce its own aberrations.) In particular, one of the color channels—color channel c—is a blurred color channel due to a channel dependent color aberration affecting that channel. In an aim sharpness block 14, one of the other color channels (other than the blurred color channel), in this case channel b, is used as an indication of an aim sharpness. As will be shown, the aim sharpness is characterized by, or otherwise related to, the modulation transfer function (MTF) of the other color channel, that is, channel b, used as an indication of the aim sharpness. This aim sharpness is put to use in a sharpness adjustment block 16 to adjust the sharpness of the blurred color channel c, at least partially, toward the aim sharpness. Then the three channels a, b and c are combined, or otherwise processed, in an output block 18 to form the sharpness-corrected output image signal.

There are a number of variations that can be made upon the general model shown in FIG. 1. For instance, a second color channel, e.g., channel a, could also be a blurred color channel due to a channel dependent color aberration affecting that channel. In that case, an additional block (not shown) would be provided for adjusting the sharpness of the second blurred color channel a, at least partially, toward the aim sharpness obtained from the channel b. Furthermore, the blurred color channel c may be adjusted toward the aim sharpness of the other color channel b and, additionally, enhanced toward an additional sharpness that is greater than the aim sharpness. Since the channel b is used as an indication of an aim sharpness, the aim sharpness may actually be greater than the actual sharpness of the other color channel b. Alternatively, the sharpness adjustment block 16 may produce a sharpness that is greater than the aim sharpness, or produce a sharpness that is less than or substantially equal to the aim sharpness. In addition to being a longitudinal color aberration, the channel dependent color aberration may be a channel dependent degradation due to a color filter array used in the step of capturing the image, or a channel dependent degradation due to a field dependent aberration. In the latter case, the field dependent aberration may be a function of a radial distance from a center of the image.

Figure 2:
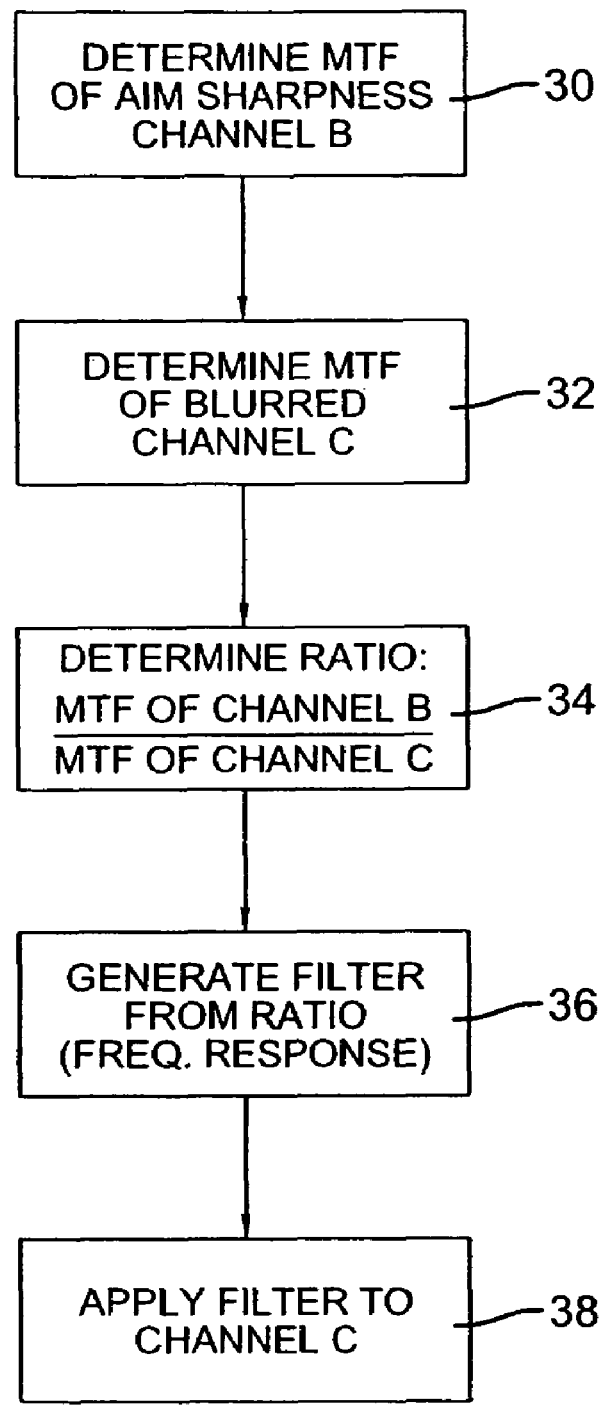
FIG. 2 is a flow diagram showing further details of a sharpness correction of a color dependent blur due to a longitudinal color aberration, as generally shown in FIG. 1.

Referring now to FIG. 2, the sharpness adjustment block 16 is there shown, in the preferred embodiment, to comprise an MTF determination block 30 for determining the MTF of the other color channel b used as an indication of the aim sharpness and an MTF determination block 32 for determining the MTF of the blurred color channel c. A ratio of the MTF of the other color channel b to the MTF of the blurred color channel c is determined in a ratio determination block 34. The ratio is used in the filter generation block 36 to generate a filter, wherein the ratio is the aim frequency response of the filter. Finally, the filter is applied to the blurred color channel c in a filtering block 38 to adjust the sharpness of the blurred color channel, at least partially, toward the aim sharpness. Typically, the color channels a, b and c are red, green and blue channels, respectively, where the color channel b used as an indication of the aim sharpness is the green channel and the blurred color channel c is the blue channel. The filtering in the filtering block 38 may be done in the frequency domain or the spatial domain. The MTF of the blurred color channel c and the MTF of the other color channel b may be determined from an image measurement or from lens data.

Figure 3:
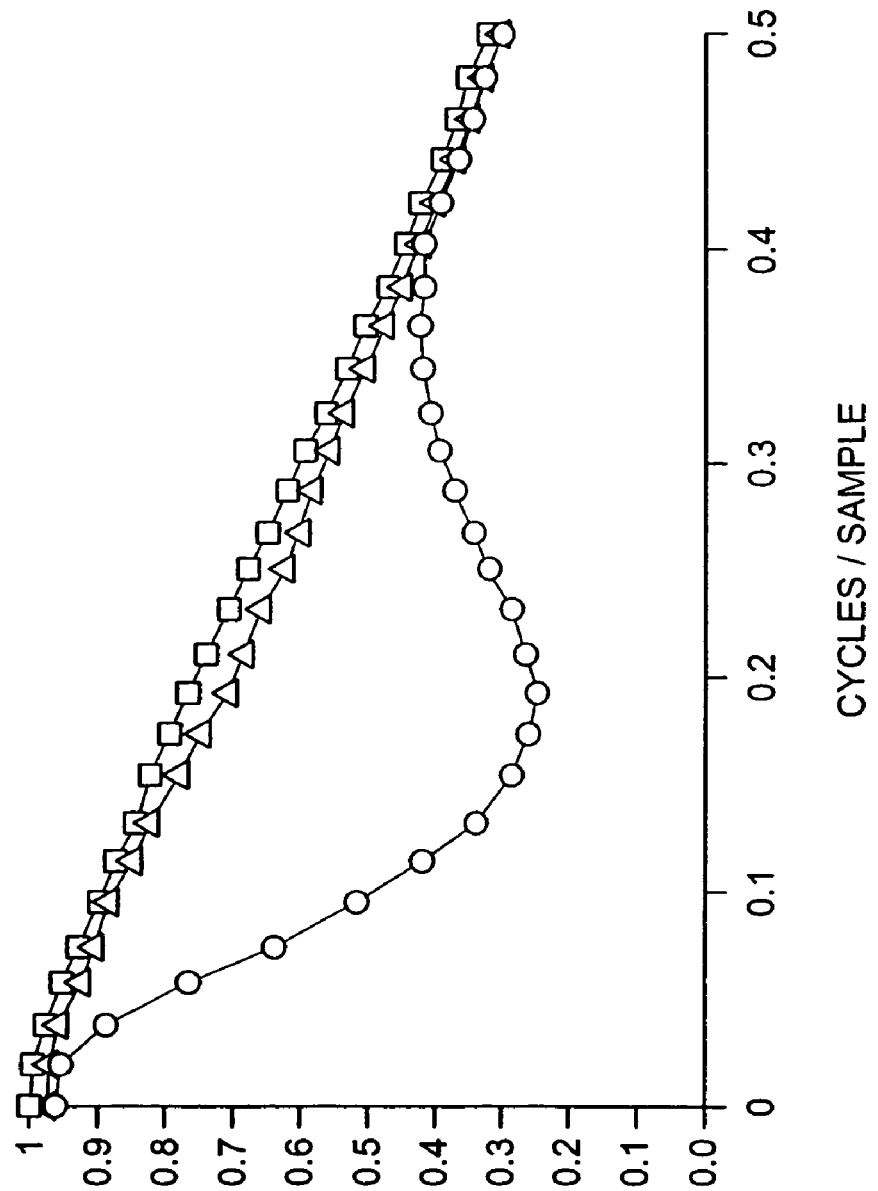
FIG. 3 shows the modulation transfer function (MTF) of the three color channels, red, green and blue, typically processed according to the invention.
Figure 4:
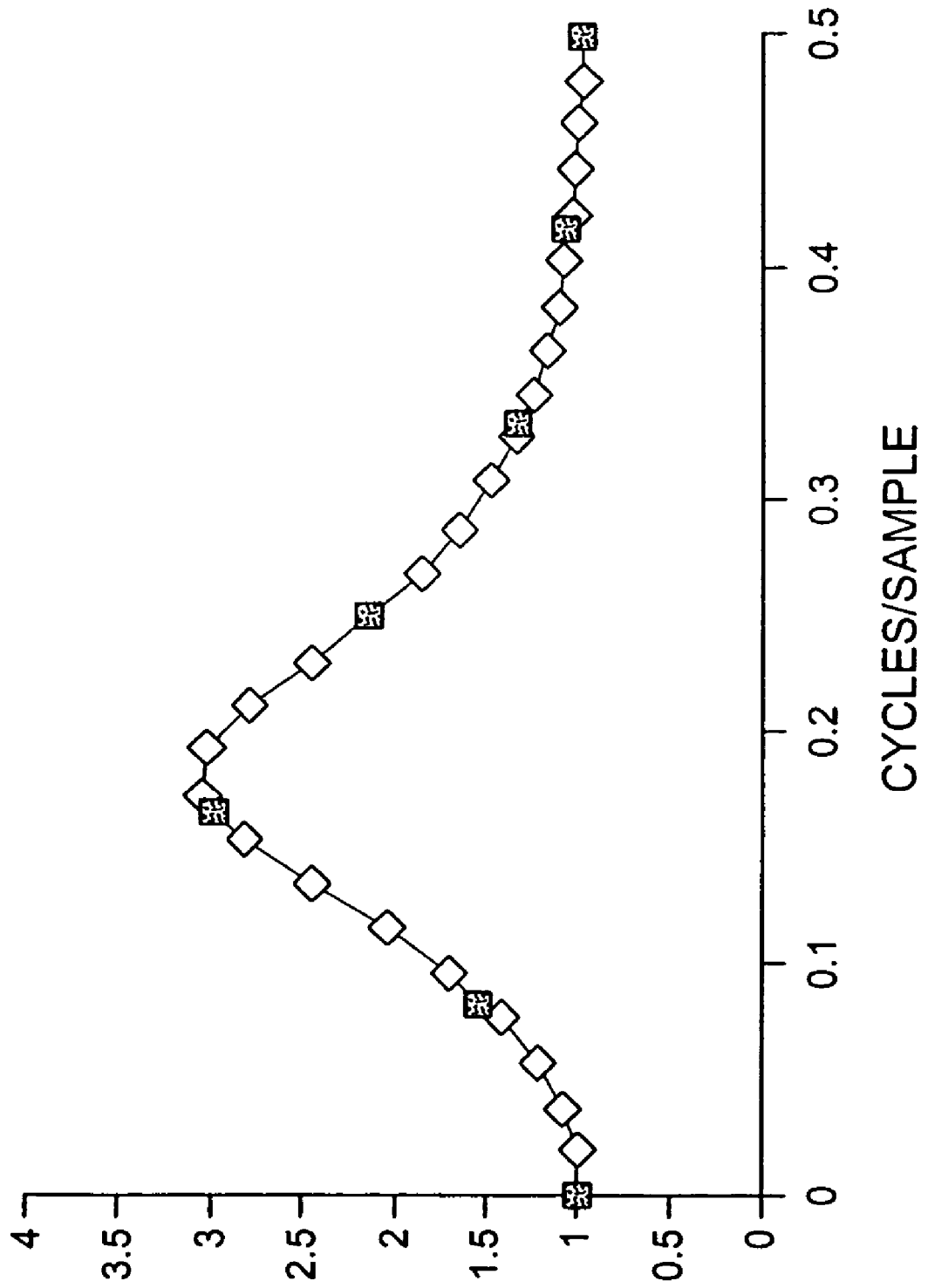
FIG. 4 shows the ratio of the green MTF to the blue MTF.

The method described in this application provides in-camera (or, as will be explained, in-host) correction of one or more color channels primarily for the purpose of removing fringing and intra-channel blur. Longitudinal color results from image focus being wavelength dependant. So, for example, the blue channel may focus optimally behind the best focus position for the red and green channels. This example produces blur in the blue channel, due to the plane of focus being behind the image sensor for the blue channel. The blur associated with this misfocus of the blue channel can be corrected by applying a filter to that plane of image data, which equalizes the sharpness of the blurred blue channel to an aim sharpness. Usually, the aim sharpness is the MTF of the green channel and thus the aim frequency response of the filter is the ratio of the MTF of the green channel to the MTF of the blue channel. FIG. 3 shows the MTF of the three color channels, where the respective responses of the channels are plotted against the frequency, measured in cycles/sample (from 0 to 0.5 cycles/sample). FIG. 4 shows the ratio of the green MTF to the blue MTF. This ratio is also the aim of the filter applied to the reduced MTF blue channel to sharpen it to the level of the green. A convolution kernel is developed with a sufficient number of taps such that it achieves an adequate approximation of the filter frequency response required to equalize the sharpness of the blue channel to the green.

In general, any well-known two-dimensional digital filter design technique may be used to develop the convolution kernel. Most digital filtering operations involve the two-dimensional discrete convolution of a small filter array with the larger image array, $$y = x \circledast h,$$

where x and y are the input and output sampled image arrays, h is the array of filter coefficients, and $\circledast$ indicates the discrete convolution operation. A common way to specify the desired characteristics of a digital filter is to do so in the frequency domain, i.e. by an MTF. If we assume that we are not interested in modifying the phase characteristics of the image, then a linear-phase finite impulse response (FIR) is needed. One well-known way to design a filter is by the window method (W. K. Pratt, *Digital Image Processing*, Wiley, pg. 291-296, 1978). The steps are as follows:

1. Form a two-dimensional array and populate it with the desired (sampled) frequency response of the filter (low-pass, high-pass, etc.)
2. Compute the inverse discrete Fourier transform (using the fast Fourier transform algorithm).
3. Truncate the resulting array of (real) coefficients, or apply a window function (e.g., Hamming Window) that also truncates the array, to the desired filter size, e.g., (5×5 or 7×7).
4. The values in this array are often rescaled so that, e.g., the sum of all elements are equal to 1.0, if needed.
5. The resulting array of coefficients, h, are convolved with an input image array, x, resulting in an output filtered image array, y.

In general, the larger the filter size, the more closely its actual MTF will match the desired response.

Figure 6:
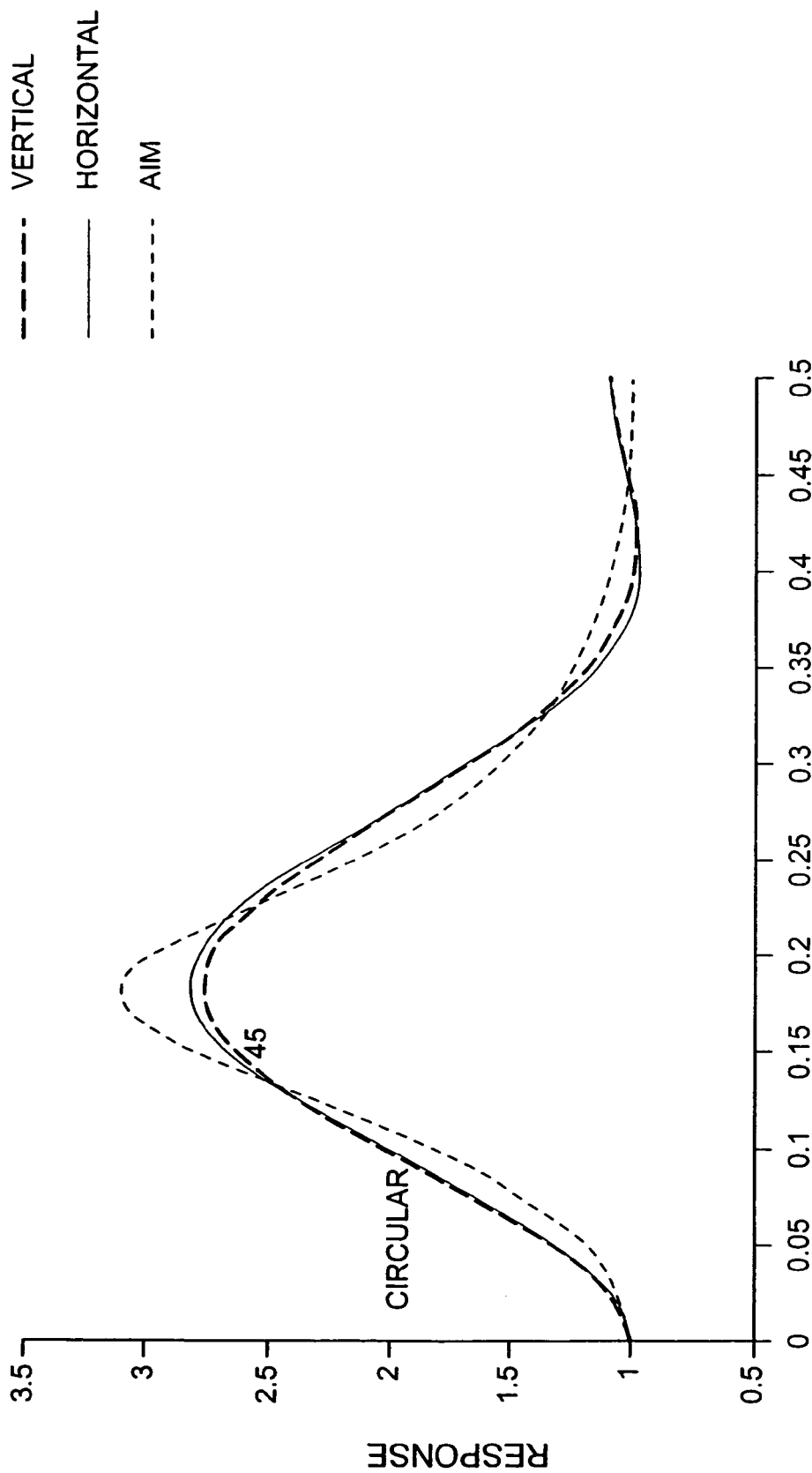
FIG. 6 shows the frequency response aim and actual filter frequency response of the filter characterized by the convolution kernel shown in FIG. 5.
Figure 7:
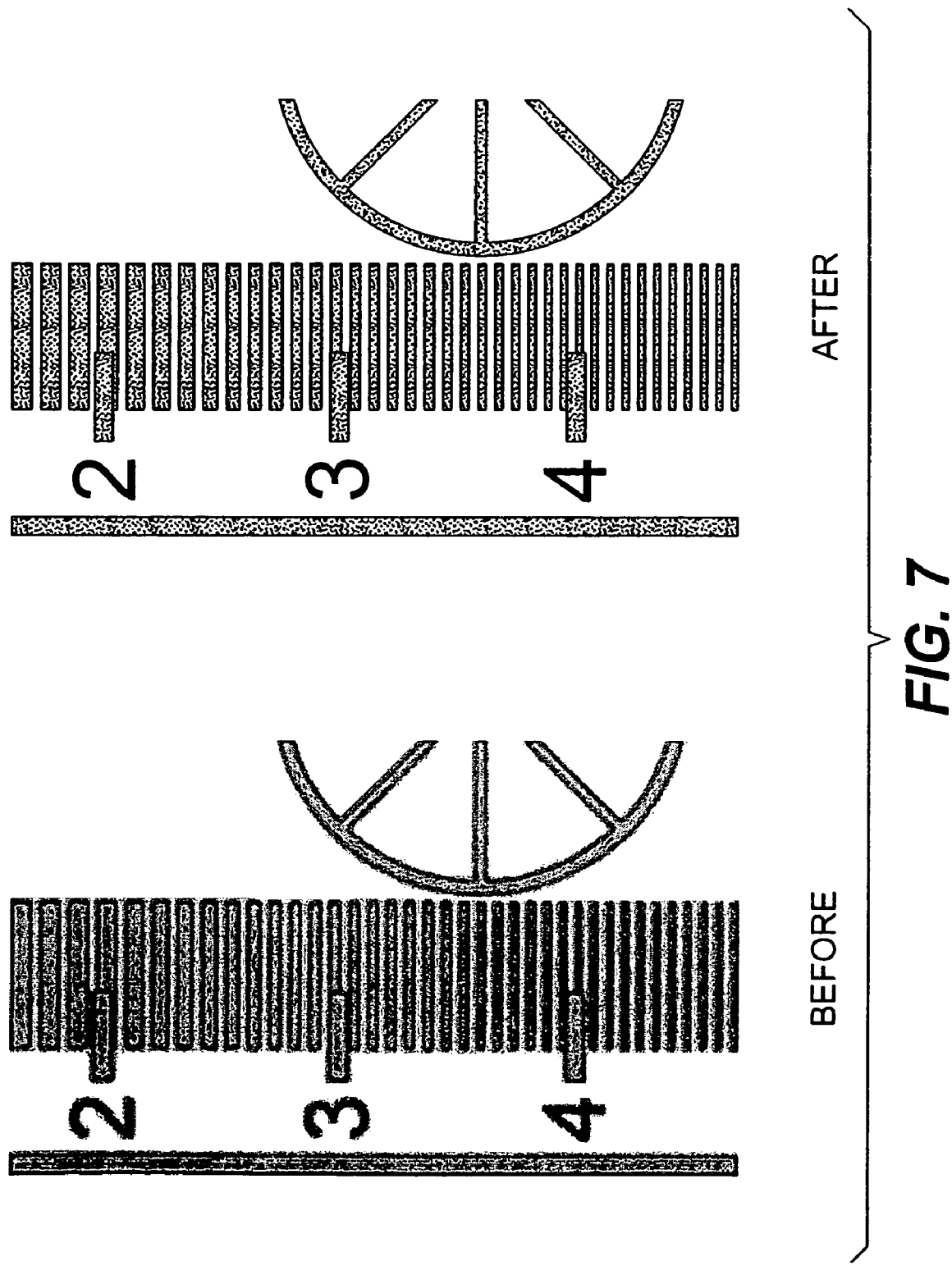
FIG. 7 shows before and after examples of an image subsection, with the technique of FIG. 1 applied according to the invention.
Figure 8:
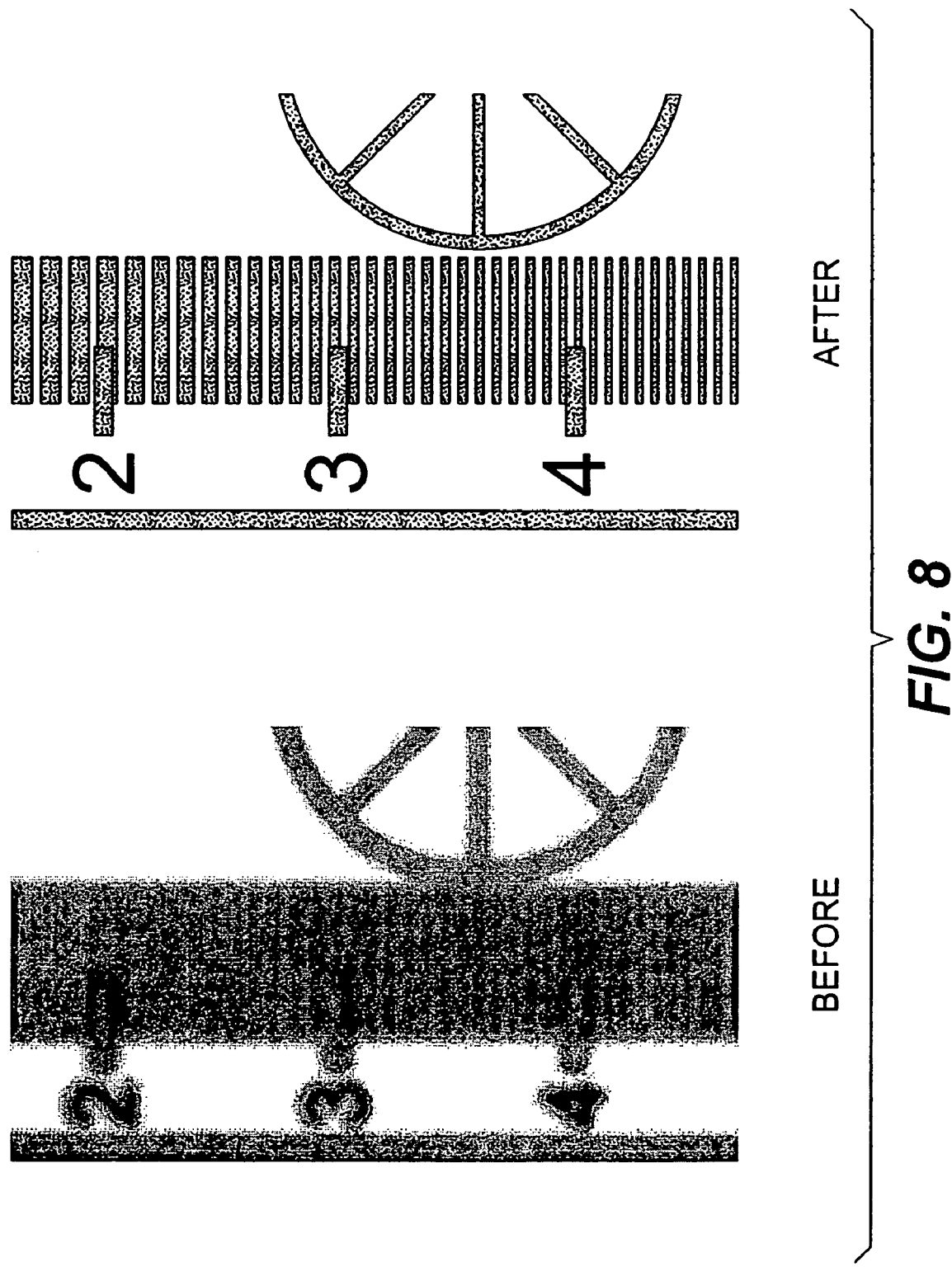
FIG. 8 shows before and after examples of the blue image plane of the image subsection shown in FIG. 7, showing more obviously the blue intra-channel blur and its correction according to the invention.

FIG. 5 shows an example of the values comprising a least squares 7×7 convolution kernel that achieves an adequate approximation of the filter frequency response, as characterized by the ratio shown in FIG. 4, that is required to equalize the sharpness of the blue channel to the green. (Clearly, as related by the filter design steps mentioned above, other sets of kernel values (e.g., as specified by other frequency responses) and other size kernels (e.g., 5×5) will perform adequately according to the invention.) FIG. 6 shows the frequency response aim and actual filter frequency response of the filter characterized according to FIGS. 3-5. FIG. 7 shows before and after examples of an image subsection with the technique of the invention applied. Evidence of both reduced yellow fringing and of reduced blue channel blur is apparent from a color rendition (not shown) of this image example (as shown in monochrome in FIG. 7). FIG. 8 shows before and after examples of only the blue image plane and shows more obviously the blue intra-channel blur and its correction in accordance with the invention.

In summary, in the typical application according to a preferred embodiment, the channel dependent aberration is a longitudinal color aberration especially in the blue color record or file of a digital image, where the digital image comprises red, green and blue color channels. The color channels are imaged (block 10) by an optical system having the aberration, where the blue color channel is a blurred color channel due in particular to the longitudinal color aberration affecting that channel. The method according to one typical application of the invention may be characterized by the following steps:

(a) using another color channel, other than the blue color channel, as a measure of an aim sharpness (aim sharpness block 14);

(b) measuring a modulation transfer function (MTF) of the optical system for at least the blue color channel and the other color channel used as a measure of aim sharpness (MTF determination blocks 30 and 32);

(c) computing a ratio of the MTF of the other color channel to the MTF of the blue color channel (ratio determination block 34);

(d) using the ratio to generate a filter (filter generation block 36);

(e) capturing an image comprising the color channels, where the blue color channel is a blurred color channel due to the longitudinal color aberration (image capture block 12); and (f) applying the filter to the blue color channel to equalize the sharpness of the blue color channel, at least partially, to the aim sharpness (filtering block 38).

This characterization is useful in describing several embodiments of the invention in relation to where the steps are performed in a digital capture system. For instance, steps (a)-(d) may be performed in relation to manufacture, testing or other pre-use preparation of a digital camera and steps (e)-(f) are then performed in the digital camera itself to modify the image files. In that case, the actual filter data necessary to adjust the sharpness of the blurred color channel would be stored in the camera itself, or, e.g., in a memory appliance (e.g., a removable memory chip or card) that can be inserted, attached or otherwise communicated (e.g., by radio frequency (rf) or infrared (ir) communication) to the camera. Alternatively, steps (a)-(d) may be performed in relation to manufacture, testing or other pre-use preparation of a digital camera, step (e) is performed in the digital camera and steps (f) is performed in a host computer that accesses the images captured by the digital camera. In the latter case, the camera may attach metadata to the image files indicating what kind of correction filter should be applied to the affected digital color channel by the host computer. The host computer may take a variety of forms, such as a personal computer in, e.g., the user's home, a digital picture kiosk in, e.g., a retail photo establishment, an on-line photo processing web site, a control computer in a retail or commercial photofinishing establishment, or the like. In any of these cases, the filter data needed to process the affected blurred color channel(s) could be resident with the host computer (especially, e.g., where a limited number of filter configurations may apply to a wide universe of applications) or the filter data may be obtained from some other source, such as on-line via downloading from some dedicated data source, such as, e.g., a manufacturer's data base pertaining to the camera.

Figure 9:
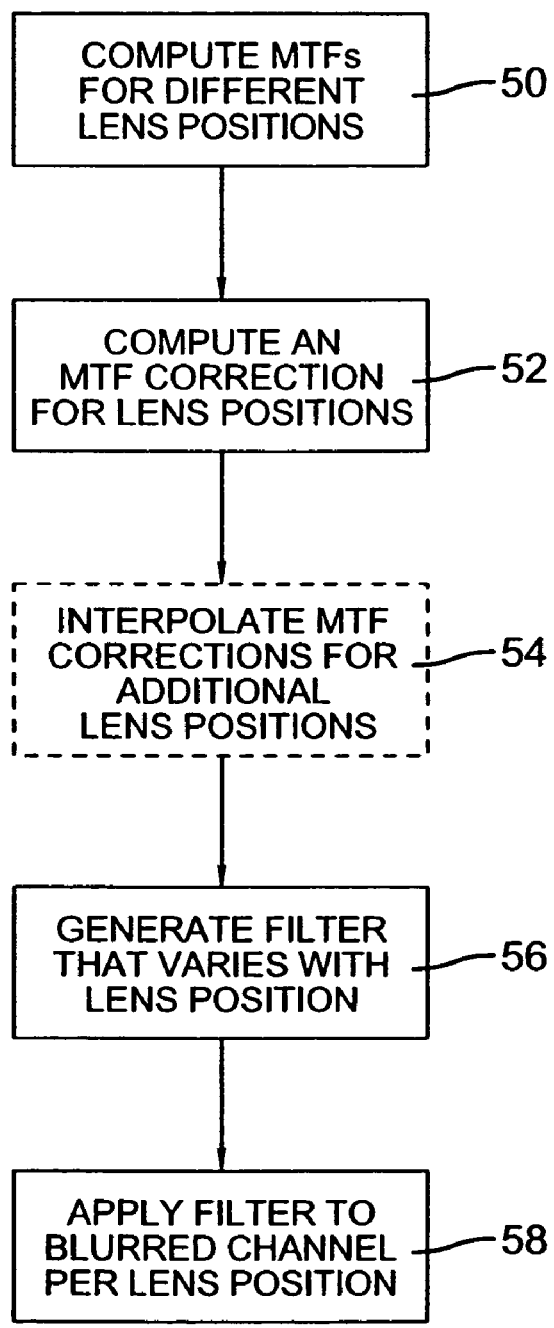
FIG. 9 is a flow diagram showing details of a sharpness correction of a color dependent blur due to a longitudinal color aberration that is dependent upon a zoom lens position.

In a further variation of the invention, the optical system (block 10) is a zoom system with a plurality of zoom lens positions and the MTF of the optical zoom system for the color channels varies for different lens positions. Consequently, as shown in an MTF determination block 50 in FIG. 9, the MTF of the other color channel b used as an indication of the aim sharpness and the MTF of the blurred color channel c is determined for a plurality of lens positions. (In a continuous zoom or a discrete zoom with many zoom positions, the MTFs will be determined for some, but not all, of the lens positions.) Then, an MTF correction is computed in a ratio computation block 52 as a ratio of the MTF of the other color channel b to the MTF of the blue color channel c for (at least some of) the lens positions. (If the correction is not computed for all of the intervening lens positions, then an MTF correction is interpolated in an interpolation block 54 from the computed corrections as a function of lens position for the intervening lens positions.) Using these computed (and interpolated) corrections, a filter is generated in a filter generation block 56 that varies its filtering effect with lens position. Finally, the filter is applied in a filtering block 58 to the blue color channel c to equalize the sharpness of the blue color channel, at least partially, to the aim sharpness dependent upon the zoom lens position. In other words, as the focal length of the zoom lens is changed, the filtering effect of the filtering block 58 is changed dependent upon the zoom lens focal length.

Figure 10:
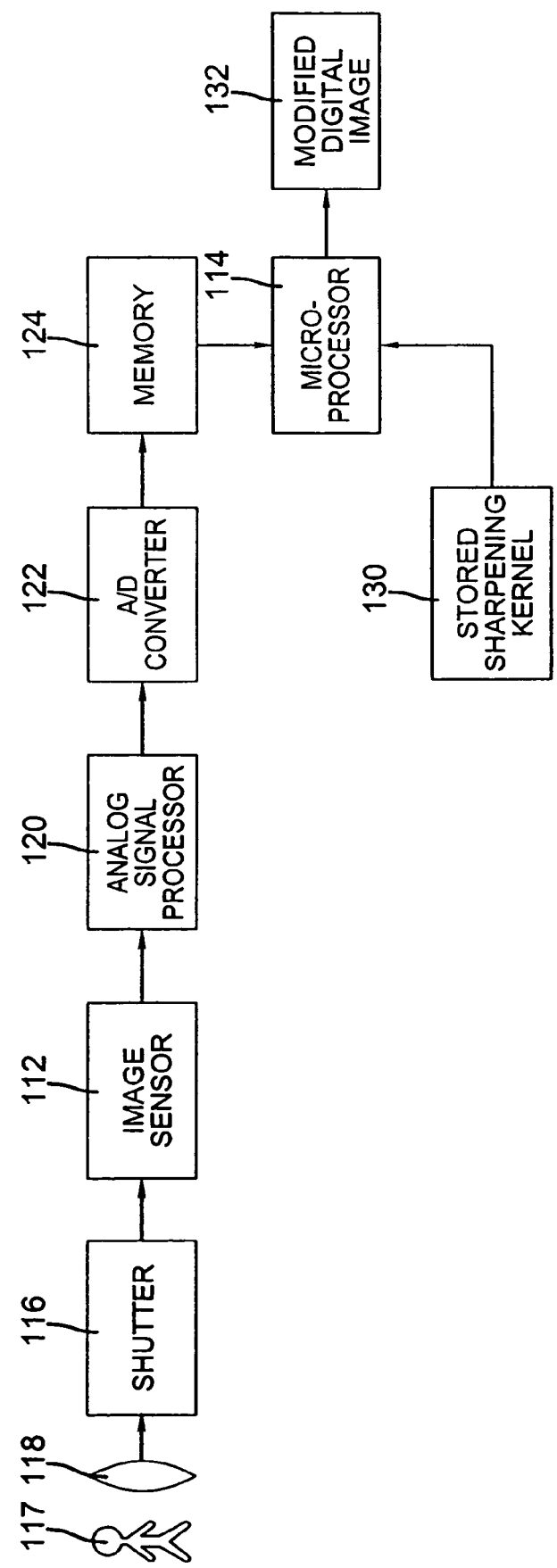
FIG. 10 is a block diagram of a digital camera having an arrangement for applying a channel dependent sharpening kernel to the blurred blue color channel in accordance with the present invention.

Turning now to FIG. 10, a generalized schematic for the operation of a digital camera, which can be used in accordance with the present invention is shown. The digital camera includes an image sensor 112 which includes a two-dimensional array of photosites corresponding to picture elements (pixels) of the image. The image sensor 112 can be a conventional charge-coupled device (CCD) using either well known interline transfer or frame transfer techniques, or a complementary metal oxide semiconductor (CMOS) imager. An image is captured under the control of a microprocessor 114 which causes a shutter 116 to open and an image of a subject 117 is applied by a lens 118 to the image sensor 112. When the image sensor 112 is exposed to the image light, analog image charge is produced in respective photosites. After the shutter 116 is closed, the charge information produced by the image sensor 112 is applied to an analog signal processor 120. The analog signal processor 120 controls the read-out clocking of the image sensor 112 and converts the charge information to analog image signals corresponding to respective picture elements. The analog image signals from the analog signal processor 120 are applied to an analog to digital (A/D) converter 122, which produces a digital image signal from the analog input signal for each picture element. The captured digital image signals are stored in memory 124.

The image captured by the image sensor 112 has channel dependent blur which is a function of the system MTF of at least one of the color channels, in this case the blue color channel. In accordance with the present invention, a filter is created which comprises a plurality of values that are an inverse function of an aim sharpness as represented by another of the color channels, such as the green color channel. These values can be applied as a stored sharpening function, such as a stored sharpening kernel 130. As shown in FIG. 10, the microprocessor 114 receives the stored sharpening kernel 130, and applies the sharpening kernel 130 to the digital image, and a modified image 132 is produced which is sharpened and corrected for channel dependent blur.

Figure 11:
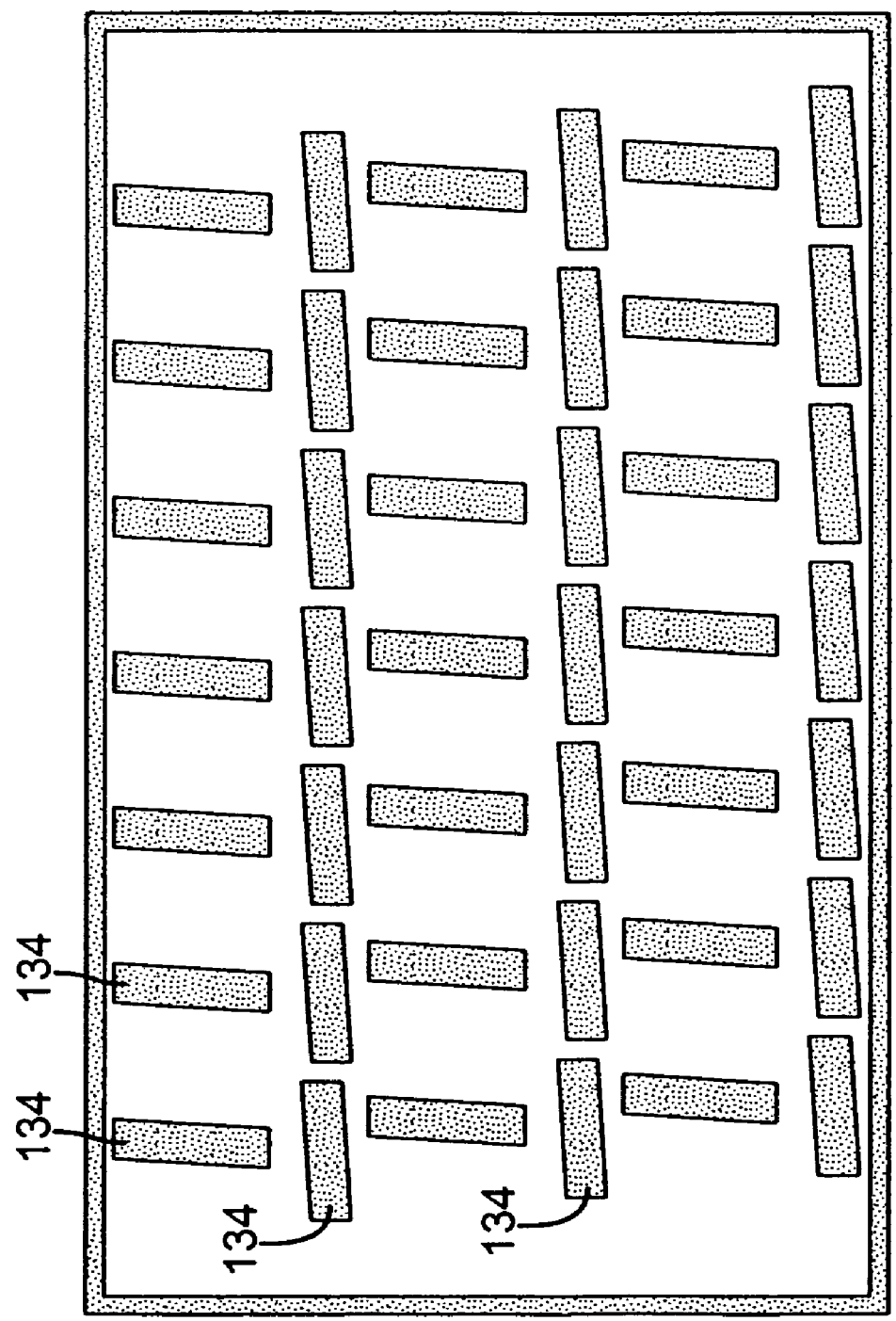
FIG. 11 is a diagram of an exemplary test target having multiple edges, which can be used to determine the system MTF.

Implementation of the sharpening kernel 130 can take the form of a direct convolution in a manner well known to those skilled in the art. To create the sharpening kernel 130, the camera manufacturer first characterizes the MTF of the green and blue channels of the image created by the electronic camera, and determines the ratio of the two MTF functions, as hereinbefore explained. It will be appreciated that the local value of the system MTF for an electronic camera is a function of the MTF of the optical components (i.e., the lens and the blur filter), and as well as MTF degradation associated with the electronic acquisition and processing components, such as image sensor charge transfer inefficiencies. It will also be appreciated that with film cameras, the system MTF is a function of the MTF of the optical components, as well as blur caused by mispositioning of the film relative to the focal plane. A preferred method of measuring the system MTF is to utilize an oversampled edge technique to measure the MTF at various locations in the image. An example of such an oversampled edge technique is described in ISO 12233—"Photography—Electronic Still Picture Cameras—Resolution Measurements" (ISO/TC42-WG18). When this ISO technique is used, it is preferably used with a test target that is imaged by the camera. FIG. 11 shows an example of a test target having multiple edges 134. Each edge 134 can be used to determine the MTF of the imaging system at the location of the edge 134. For a more detailed description of MTF measurement, see commonly-assigned U.S. Pat. Nos. 5,696,850 and 5,939,246, the disclosures of which are herein incorporated by reference.

There are image blur aberrations other than a channel dependent blur due to a longitudinal color aberration. For instance, in a camera, the image formed at the focal plane (i.e., on a photosensitive film or on a photosensitive array (e.g., a CCD or CMOS sensor)) is typically blurred as a function of proximity to the optical axis. The further away from the center of the image, the more the image is blurred. The resultant image therefore has an MTF which is a function of radial distance from the center of the image. Furthermore, an image can also possess blur due to mechanisms like image sensor charge transfer inefficiency. Sensor based mechanisms will, in general, have different symmetry than the described lens mechanism, but are also correctable. In either case, such blur is referred to as a field dependent or position dependent blur.

In the aforementioned commonly assigned U.S. Pat. No. 6,628,329, which is incorporated herein by reference, images are sharpened and corrected for position dependent blur. A sharpening function operates upon, and sharpens, signals corresponding to a selected number of pixels in an image. In addition, a plurality of values are generated which are a function of the position dependent blur in the image. These values are then used to modify the sharpening function so that after the modified sharpening function is applied to the image, a sharpened image will be provided which has been corrected for the position dependent blur. The present invention extends this field dependent sharpening concept to individual color channels, where the blur aberration is also a channel dependent degradation imparted to the already-existing field dependent aberration, that is, the position dependent blur is a function of the channel as well as the position in the image. Typically, for example, a greater position dependent blur will be observed in the blue channel than in the red and green channels.

Figure 12:
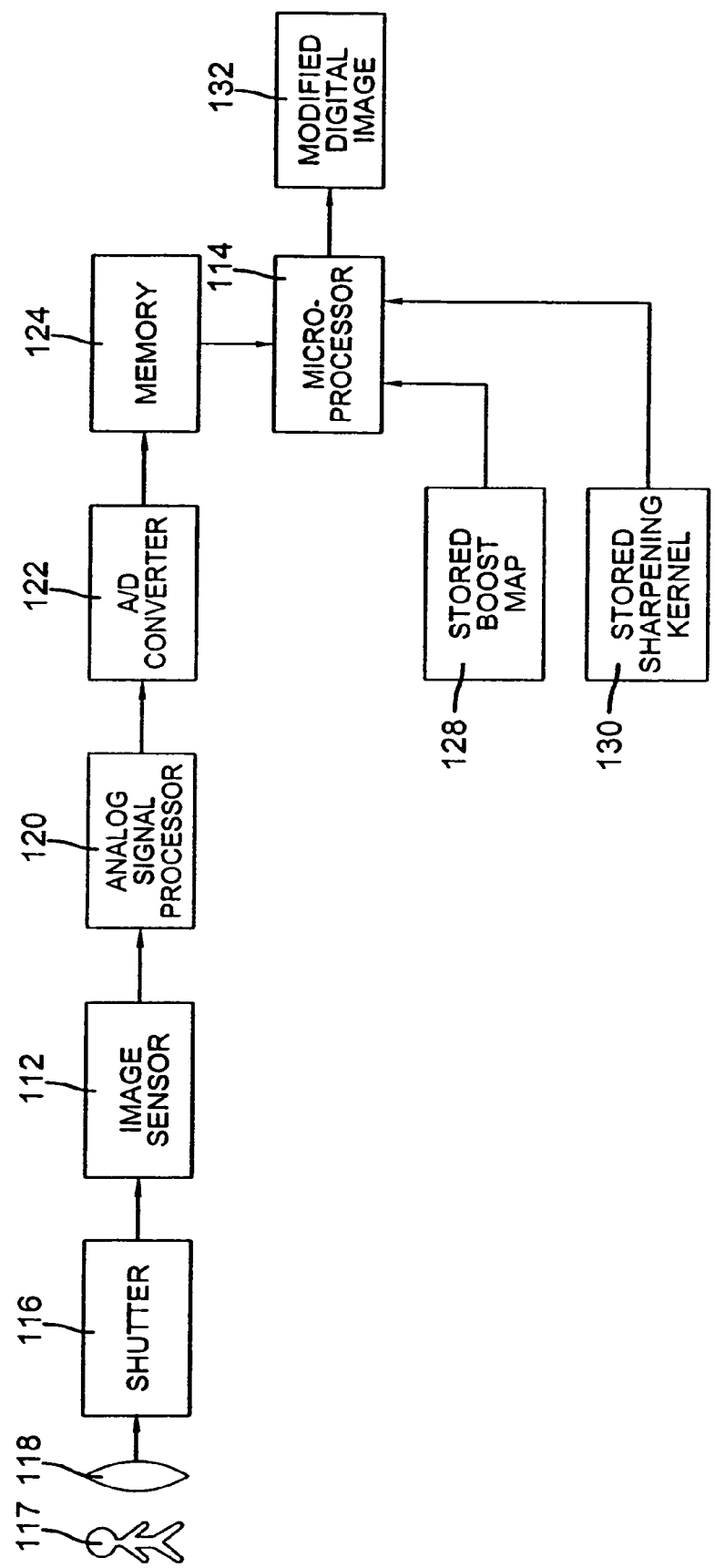
FIG. 12 is a block diagram of a digital camera having a general arrangement for modifying a channel dependent sharpening kernel by applying a boost map to the sharpening kernel to account for a field dependent aberration.

FIG. 12 is a block diagram of a digital camera having a general arrangement for providing a channel dependent sharpening kernel according to the present invention, and modifying the kernel by applying a boost map to the sharpening kernel in accordance with the teaching of the aforementioned U.S. Pat. No. 6,628,329. Because many of the components in FIG. 12 are identical to the components shown in FIG. 10, reference should be made to FIG. 10 and its corresponding description for an explanation of such components. In this embodiment, the image captured by the image sensor 112 has position dependent blur which is a function of the system MTF. In accordance with the aforementioned U.S. Pat. No. 6,628,329, a boost map 128 is created which is a plurality of values which are a function of the position dependent blur of the captured image, and which can be applied to the stored sharpening kernel 130. As shown in FIG. 12, the microprocessor 114 receives the stored boost map 128 and the stored sharpening kernel 130, and modifies the stored sharpening kernel 130 in response to the boost map 128. In particular, the boost map 128 varies the boost strength of the stored sharpening kernel 130 so as to spatially compensate for the local value of the system MTF and correct for the position dependent blur of the captured image. The microprocessor 114 applies the modified sharpening kernel 130 to the digital image, and a modified image 132 is produced which is sharpened and corrected for channel dependent, as well as position dependent, blur.

To create the boost map 128, the camera manufacturer first characterizes the MTF of a film camera or an electronic camera and the associated processing components, and determines the local value of the system MTF. The local value of the system MTF for an electronic camera is a function of the MTF of the optical components (i.e., the lens and the blur filter), and as well as MTF degradation associated with the electronic acquisition and processing components, such as image sensor charge transfer inefficiencies. It will be appreciated that with film cameras, the system MTF is a function of the MTF of the optical components, as well as blur caused by mispositioning of the film relative to the focal plane. As in the embodiment of FIG. 10, a preferred method of measuring the system MTF is to utilize an oversampled edge technique to measure the MTF at various locations in the image.

The camera manufacturer then develops the boost map 128 as an array of position dependent gain factors (boost values) stored in a two-dimensional look-up table which scale the coefficients of the sharpening kernel 130 on a pixel-by-pixel basis in response to the local value of the system MTF in order to correct for the position dependent blur of the captured image. For each pixel of the captured image, the boost map 128 includes a corresponding boost value. The stored boost map 128 may have a similar number of array values as the image sensor 112, or may have a reduced number of values (for example, $\frac{1}{16}$ as many rows and $\frac{1}{16}$ as many columns) which are repeated or bilinearly interpolated, for example, to provide the boost factors for each pixel. Alternatively, the boost map 128 can be defined by a two-dimensional polynomial equation representing the gain required to obtain desired local values of the system MTF. Since the MTF is a slowly varying function of position, a two-dimensional polynomial equation will generally suffice rather than a memory intensive multi-dimensional lookup table.

Reference should be made to the aforementioned commonly assigned U.S. Pat. No. 6,628,329, which is incorporated herein by reference, for further description of the techniques for making and using such boost maps, as well as an exemplary image having position dependent blur and an exemplary boost map, respectively, each within a grid pattern illustrating pixels of the image field relative to an optical center.

Figure 13:
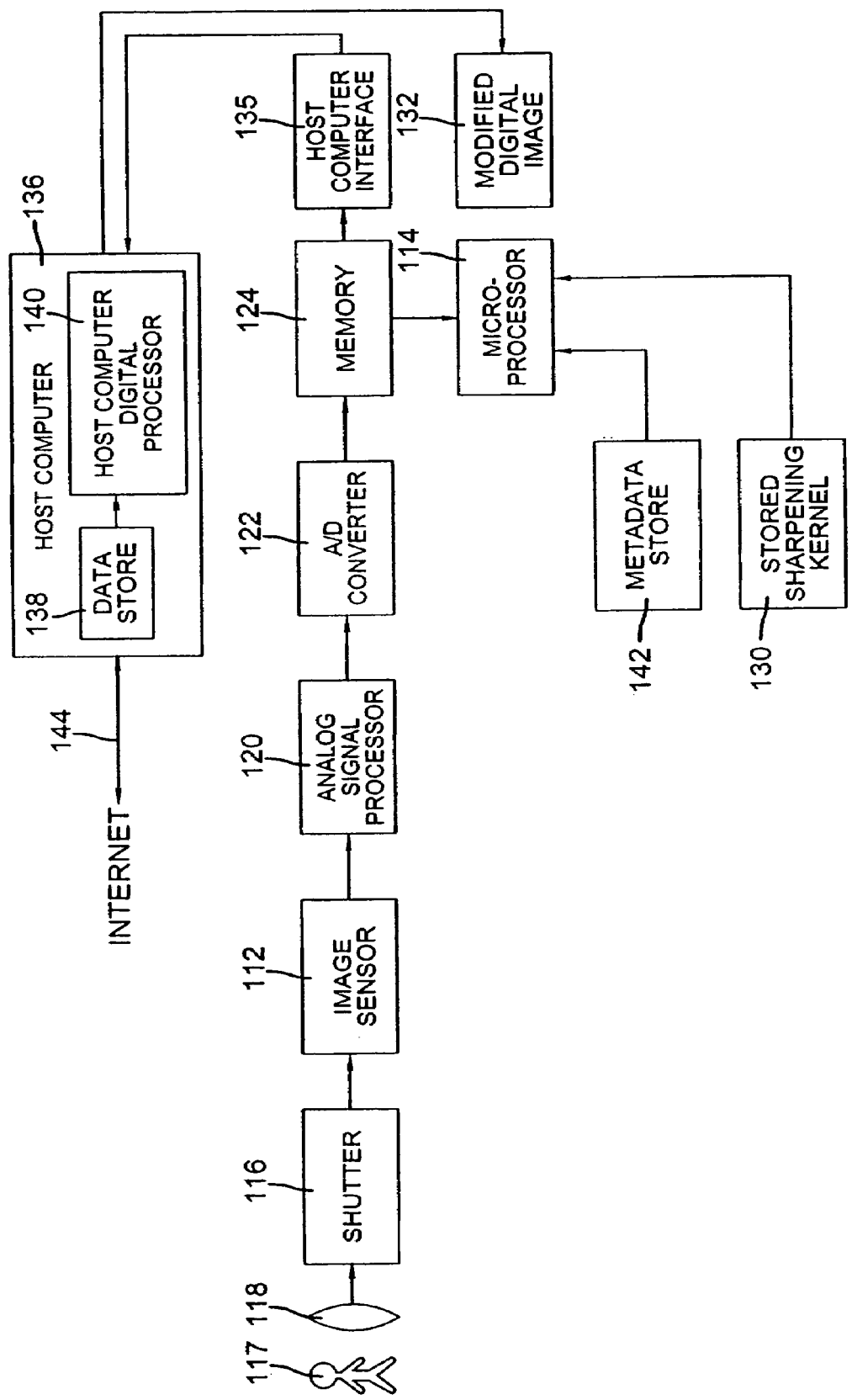
FIG. 13 is a block diagram of a digital capture and processing system having a digital camera for capturing a digital image that is subsequently processed by a host computer for applying a channel dependent correction to the blurred color channel in accordance with the present invention.

FIG. 13 is a block diagram of a digital capture and processing system having a digital camera for capturing a digital image that is subsequently processed by a host computer for applying a channel dependent correction to the blurred color channel in accordance with the present invention. Because many of the components in FIG. 13 are identical to the components shown in FIG. 10, reference should be made to FIG. 10 and its corresponding description for an explanation of such components. In this embodiment, the digital camera includes a host computer interface 135 for connecting with a host computer 136. The host computer interface 135 may take a variety of forms, such as (without limitation) a cable connection (e.g., FIREWIRE or USB), a memory card interface (e.g., a PCMCIA card connection), a radio frequency or infrared connection, and the like. The host computer 136, which interfaces with the digital camera and processes the captured image, includes (a) a data store 138 for storing the channel dependent filter, such as the kernal coefficients shown in FIG. 5 and a digital processor 140 (typically implementing software algorithms) for applying the filter to the blurred color channel to adjust the sharpness of the blurred color channel, at least partially, toward the aim sharpness. The channel-corrected output image 132 is then provided by the host computer 136. The host computer may take a variety of forms, such as a personal computer in, e.g., the user's home, a digital picture kiosk in, e.g., a retail photo establishment, an on-line photo processing web site, a control computer in a retail or commercial photofinishing establishment, or the like.

In this embodiment, the camera may attach metadata to the image files indicating what kind of correction filter should be applied to the affected digital color channel by the host computer 136. For example, the microprocessor 114 applies metadata from a metadata store 142 indicating the type of camera and/or the type of filtering that should be applied to the image files. The filter data needed to process the affected blurred color channel(s) could be resident with the host computer 136 (especially, e.g., where a limited number of filter configurations may apply to a wide universe of applications) or the filter data may be obtained from some other source, such as on-line (signified by internet connection 144) via downloading from some dedicated data source, such as, e.g., a manufacturer's data base pertaining to the camera. In another variation of the invention, such an internet connection could be made directly to the digital camera shown in FIG. 10 to provide the appropriate sharpening kernel, rather than having the kernel stored in the camera.

These concepts for correcting channel dependent color aberrations in a digital image may be adapted for use in a cell phone of the type having a picture taking capability. Accordingly, and as shown in a further embodiment of the invention in FIG. 14A, a cell phone 200 includes a phone stage comprising a microphone 202 for capturing the voice of a caller, related electronics (not shown) for processing the voice signals of the caller and the person called, and a speaker 204 for reproducing the voice of the one called. A keypad 206 is provided for entering phone numbers and image capture commands, and a (LCD) display 208 for showing phone-related data and for reproducing images captured by the phone or received over the cellular network. The rear view of the cell phone 200 shown in FIG. 14B identifies some of the internal components, including a cellular image capture assembly 210 (comprising a lens 211 and an image sensor (not shown)) connected via an image processor 212 to a cellular processing stage comprising a cellular processor 214 and a modem 216. The cellular processor 214 receives and processes the image data from the image processor 212 and the voice data captured by the microphone 202, and transfers the image and voice data to the cellular modem 216. The cellular modem 216 converts the digital image and voice data into the appropriate format for transmission by the antenna 218 to a cellular network.

Figures 14A, 14B:
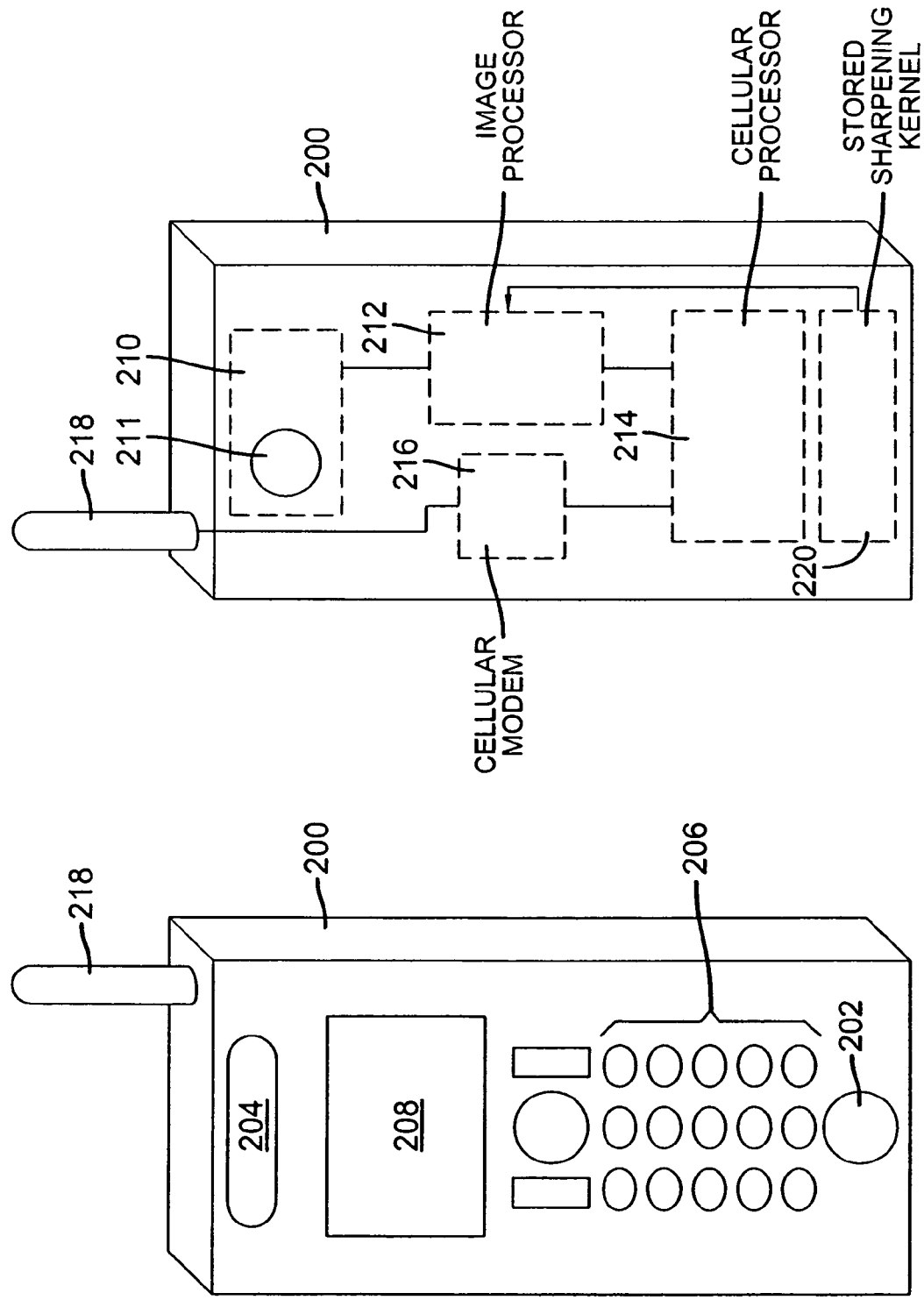
FIGS. 14A and 14B are perspective views of the front and back of a cell phone including a camera having an arrangement for applying a sharpening kernel to a blurred color channel in accordance with the present invention.

The image captured by the image capture assembly 210 has channel dependent blur which is a function of the system MTF of at least one of the color channels, such as the blue color channel. In accordance with the present invention, a filter is created which comprises a plurality of values that are an inverse function of an aim sharpness as represented by another of the color channels, such as the green color channel. These values can be applied as a stored sharpening function, such as a stored sharpening kernel 220, as described in connection with FIG. 10. As shown in FIG. 14B, the image processor 212 receives the stored sharpening kernel 220, and applies the sharpening kernel 220 to the digital image, and a modified image is produced which is sharpened and corrected for channel dependent blur. Instead of an in-phone correction, the cell phone 200 may include a host computer interface (not shown) for connecting with a host computer (also not shown) for processing the image and correcting for channel dependent color aberrations, as described in connection with FIG. 13. The host computer may instead be available over the cellular network, and the cell phone 200 may transmit the uncorrected image over the cellular network to the host computer, where the image is corrected for channel dependent color aberrations. The corrected image may then be returned to the cell phone 200 for display on the display 208 or otherwise communicated to other recipients.

Practicing the invention described in this disclosure begins with measuring the MTF of each of the color channels in a digital image. This can be accomplished by using tools such as the aforementioned ISO 12233—Resolution in a Digital Camera Standard SFR measurement tool. This tool uses the image edge features from the ISO-12233 Resolution Target. The user selects regions of interest, which span the light and dark regions of the edge. The utility will compute the spatial frequency response (MTF) of the system using the edge feature. Rather than forming the luminance MTF by weighing each color channel in some fashion for the purpose of reporting the resolution or MTF of the imaging system, in this invention each channel's MTF is measured and used in the development of a filter. Other MTF determining methods could also be employed. For example, optical design software packages typically specify the wavelength dependant MTFs. The Green MTF values, from 0 to 0.5 cycles/sample, are divided by the Blue MTF values across the same frequency range. The result of this frequency by frequency division, is the aim frequency response of the needed filter. This filter is then applied to the blue channel image, thus equalizing the blue channel's MTF to that of the green channel's MTF.

Filtering of the blue image plane may be done in either the frequency or spatial domain. Typically, a convolution in the spatial domain is less computationally complex than frequency plane transformation and manipulation, especially for smaller convolution kernels. The example in this specification shows a 7×7 kernel in FIG. 5 (kernel values) and FIG. 6 (kernel and aim frequency responses), which adequately simulates the desired frequency response, which corrects the blue channels sharpness to that of the green. Even with this non-monotonic frequency response, a 7×7 kernel appears to sufficiently well mimic the aim frequency response. For well-behaved aim frequency responses, the kernel size can be smaller than 7×7.

Longitudinal color aberration, a direct result of a camera's lens design is just one mechanism that can cause unequal color channel MTFs. This invention can repair longitudinal color aberration and other color channel dependant degradations. For example, the color filter array (CFA) of an imager may be a specific pattern, such as the well-known Bayer CFA pattern. The Bayer CFA sampling possesses an inherent reduced red and blue (relative to the green) MTF characteristic. Some CFA interpolation reconstruction (de-mosaicking) algorithms make use of the higher MTF green channel in the reconstruction of the red and blue planes, but frequently the red and blue channels are less sharp than the green. This invention can also repair images suffering from reduced MTF due to the CFA sampling of the focal plane. This scenario requires two filtering operations, one on the red and one on the blue channel.

The invention has been described in detail with particular reference to certain preferred embodiments thereof, but it will be understood that variations and modifications can be effected within the spirit and scope of the invention.

The invention claimed is:

1. A method for correcting a channel dependent color aberration in a digital image, where the digital image comprises a plurality of color channels, said method comprising the steps of:
   capturing an image comprising a plurality of color channels, wherein one of the color channels is a blurred color channel due to a channel dependent color aberration affecting that channel;
   using another color channel, other than the blurred color channel, as an indication of an aim sharpness; and
   adjusting the sharpness of the blurred color channel, at least partially, toward the aim sharpness;
   wherein the aim sharpness is a modulation transfer function (MTF) of the other color channel.

2. The method as claimed in claim 1 wherein a second color channel is a blurred color channel due to a channel dependent color aberration affecting that channel and the sharpness of the second blurred color channel is adjusted, at least partially, toward the aim sharpness.

3. The method as claimed in claim 1 wherein the blurred color channel is adjusted toward the aim sharpness of the other color channel and enhanced toward an additional sharpness that is greater than the aim sharpness.

4. The method as claimed in claim 1 wherein the step of adjusting produces a sharpness that is greater than the aim sharpness.

5. The method as claimed in claim 1 wherein the step of adjusting produces a sharpness that is less than or substantially equal to the aim sharpness.

6. The method as claimed in claim 1 wherein the channel dependent color aberration is a longitudinal color aberration.

7. The method as claimed in claim 1 wherein the channel dependent color aberration is a channel dependent degradation due to a color filter array used in the step of capturing the image.

8. The method as claimed in claim 1 wherein the aim sharpness is related to a modulation transfer function (MTF) of the other color channel used as an indication of the aim sharpness.

9. A method for correcting a channel dependent color aberration in a digital image, where the digital image comprises a plurality of color channels, said method comprising the steps of:
- capturing an image comprising a plurality of color channels, wherein one of the color channels is a blurred color channel due to a channel dependent color aberration affecting that channel;
- using another color channel, other than the blurred color channel, as an indication of an aim sharpness; and
- adjusting the sharpness of the blurred color channel, at least partially, toward the aim sharpness;
- wherein the aim sharpness is related to a modulation transfer function (MTF) of the other color channel used as an indication of the aim sharpness; and
- wherein the step of adjusting the sharpness of the blurred channel toward the aim sharpness comprises the steps of:
- determining the MTF of the blurred color channel and the MTF of the other color channel used as an indication of the aim sharpness;
- determining a ratio of the MTF of the other color channel to the MTF of the blurred color channel;
- using the ratio to generate a filter, wherein the ratio is the aim frequency response of the filter; and
- applying the filter to the blurred color channel to adjust the sharpness of the blurred color channel, at least partially, toward the aim sharpness.

10. The method as claimed in claim 9 wherein the other color channel used as an indication of the aim sharpness is a green channel.

11. The method as claimed in claim 9 wherein the blurred color channel is a blue channel.

12. The method as claimed in claim 9 wherein the filtering is done in the frequency domain.

13. The method as claimed in claim 9 wherein the filtering is done in the spatial domain.

14. The method as claimed in claim 9 wherein the MTF of the blurred color channel and the MTF of the other color channel are determined from an image measurement.

15. The method as claimed in claim 9 wherein the MTF of the blurred color channel and the MTF of the other color channel are determined from lens data.

16. A method for correcting a longitudinal color aberration in a digital image, where the digital image comprises red, green and blue color channels imaged by an optical system having the aberration, and where the blue color channel is a blurred color channel due in particular to the longitudinal color aberration affecting that channel, said method comprising the steps of:
- (a) using another color channel, other than the blue color channel, as a measure of an aim sharpness;
- (b) measuring a modulation transfer function (MTF) of the optical system for at least the blue color channel and the other color channel used as a measure of aim sharpness;
- (c) computing a ratio of the MTF of the other color channel to the MTF of the blue color channel;
- (d) using the ratio to generate a filter;
- (e) capturing an image comprising the color channels, where the blue color channel is a blurred color channel due to the longitudinal color aberration; and
- (f) applying the filter to the blue color channel to equalize the sharpness of the blue color channel, at least partially, to the aim sharpness.

17. The method as claimed in claim 16 wherein the ratio is the aim frequency response of the filter.

18. The method as claimed in claim 16 wherein the other channel is the green color channel.

19. The method as claimed in claim 16 wherein the optical system is a zoom system with a plurality of zoom lens positions and the MTF of the optical system for the color channels varies for different lens positions, wherein the method further comprises:
- computing an MTF correction as a ratio of the MTF of the other color channel to the MTF of the blue color channel for at least some of the lens positions;
- using the computed corrections to generate a filter that varies its filtering effect with lens position; and
- applying the filter to the blue color channel to equalize the sharpness of the blue color channel, at least partially, to the aim sharpness dependent upon the zoom lens position.

20. The method as claimed in claim 19 further comprising the step of interpolating an MTF correction from the computed corrections as a function of lens position.

21. The method as claimed in claim 16 wherein the MTF of the blue color channel and the MTF of the other color channel are determined from an image measurement.

22. The method as claimed in claim 16 wherein the measurement of each channel MTF is obtained from an oversample edge technique used for MTF determination.

23. The method as claimed in claim 16 wherein the measurement of each channel MTF is obtained from a sine target MTF determination.

24. The method as claimed in claim 16 wherein steps (a)-(d) are performed in relation to manufacture of a digital camera and steps (e)-(f) are performed in the digital camera.

25. The method as claimed in claim 16 wherein steps (a)-(d) are performed in relation to manufacture of a digital camera, step (e) is performed in the digital camera, and step (f) is performed in a host computer that accesses the images captured by the digital camera.

26. A digital camera for capturing a digital image, where the digital image comprises a plurality of color channels, said digital camera comprising:
- an optical system having a channel dependent color aberration;
- an image capture section for capturing an image comprising the color channels, where one of the color channels is a blurred color channel due to the channel dependent color aberration affecting that channel;
- a data store for storing a filter, wherein the filter is obtained by using another color channel, other than the blurred color channel, as an indication of an aim sharpness; and
- a processor for applying the filter to the blurred color channel to adjust the sharpness of the blurred color channel, at least partially, toward the aim sharpness;
- wherein the aim sharpness is a modulation transfer function (MTF) of the other color channel.

27. The camera as claimed in claim 26 wherein the filter is obtained by:
- determining the MTF of the blurred color channel and the MTF of the other color channel used as an indication of the aim sharpness;
- determining a ratio of the MTF of the other color channel to the MTF of the blurred color channel;
- using the ratio to generate a filter, wherein the ratio is the aim frequency response of the filter.

* * * * *